United States Patent
Bowers, III et al.

(10) Patent No.: US 11,300,482 B2
(45) Date of Patent: Apr. 12, 2022

(54) GRAPHICAL DIFFERENTIATION OF SPECTRAL FREQUENCY FAMILIES

(71) Applicant: Computational Systems, Inc., Knoxville, TN (US)

(72) Inventors: Stewart V. Bowers, III, Knoxville, TN (US); Anthony J. Hayzen, Knoxville, TN (US); Christopher G. Hilemon, Knoxville, TN (US)

(73) Assignee: Computational Systems, Inc., Knoxville, TN (US)

( * ) Notice: Subject to any disclaimer, the term of this patent is extended or adjusted under 35 U.S.C. 154(b) by 479 days.

(21) Appl. No.: 16/533,166

(22) Filed: Aug. 6, 2019

(65) Prior Publication Data
US 2021/0041329 A1   Feb. 11, 2021

(51) Int. Cl.
| | |
|---|---|
| *G01M 99/00* | (2011.01) |
| *G01H 1/14* | (2006.01) |
| *G01N 29/46* | (2006.01) |
| *G06T 11/20* | (2006.01) |
| *G06F 3/0482* | (2013.01) |
| *G05B 19/4065* | (2006.01) |
| *G05B 23/02* | (2006.01) |

(52) U.S. Cl.
CPC ............ *G01M 99/005* (2013.01); *G01H 1/14* (2013.01); *G01N 29/46* (2013.01);
(Continued)

(58) Field of Classification Search
CPC ...... G01M 99/005; G01M 13/00; G01H 1/14; G01H 1/003; G05B 19/4065;
(Continued)

(56) References Cited

U.S. PATENT DOCUMENTS

| | | |
|---|---|---|
| 5,109,700 A | 5/1992 | Hicho |
| 5,445,028 A | 8/1995 | Bianchi et al. |
| | (Continued) | |

FOREIGN PATENT DOCUMENTS

| | | |
|---|---|---|
| CN | 102798529 A | 11/2012 |
| CN | 107631877 A | 1/2018 |
| | (Continued) | |

OTHER PUBLICATIONS

Zimroz, R.; Urbanek, J.; Barszez, T.; Bartelmus, W.; Millioz, F.; Martin, N., "Measurement of Instantaneous Shaft Speed by Advanced Vibration Signal Processing—Application to Wind Turbine Gearbox," Metrol. Meas. Syst., vol. XVIII (2011), No. 4, pp. 701-712.

*Primary Examiner* — Jeffery A Brier
(74) *Attorney, Agent, or Firm* — Luedeka Neely Group PC

(57) ABSTRACT

Spectral machine condition energy peaks are graphically represented in a spectral plot using color coding, different line types, and/or filtering. This allows visual differentiation of spectral peaks associated with various fault frequency families from one another, whereby a machine condition analyst using computer-based analysis software can easily see each family of spectral peaks individually, without all the other spectral peaks, or in combinations of families that are relevant to a machine fault under investigation. In addition to current spectral data, the analyst can also view a historical trend of related scalar parameters plotted in conjunction with current spectral data, wherein the spectral data plot is synchronized with a time-based cursor on the trend plot.

25 Claims, 6 Drawing Sheets
(4 of 6 Drawing Sheet(s) Filed in Color)

(52) U.S. Cl.
CPC ..... *G05B 19/4065* (2013.01); *G05B 23/0221* (2013.01); *G05B 23/0275* (2013.01); *G06F 3/0482* (2013.01); *G06T 11/206* (2013.01); *G05B 2219/37434* (2013.01)

(58) Field of Classification Search
CPC ............ G05B 23/0221; G05B 23/0275; G05B 2219/37434; G05B 2219/34048; G05B 2219/37435; G06F 3/0482; G06T 11/206; G01N 29/46; G01N 29/14; G01N 29/4454; G01R 23/16
See application file for complete search history.

(56) References Cited

U.S. PATENT DOCUMENTS

| | | |
|---|---|---|
| 5,744,723 A | 4/1998 | Piety |
| 5,875,420 A | 2/1999 | Piety et al. |
| 6,192,325 B1 | 2/2001 | Piety et al. |
| 6,389,887 B1 | 5/2002 | Dusserre-Telmon et al. |
| 6,618,128 B2 | 9/2003 | Voorhis et al. |
| 6,802,221 B2 | 10/2004 | Hedeen et al. |
| 7,010,445 B2 | 3/2006 | Battenberg et al. |
| 7,930,111 B2 | 4/2011 | Luo et al. |
| 9,091,588 B2 | 7/2015 | Lefler |
| 9,389,761 B2 | 7/2016 | Roaldson et al. |
| 9,645,046 B2 | 5/2017 | Zhang et al. |
| 9,791,856 B2 | 10/2017 | Hatch et al. |
| 2007/0247462 A1 | 10/2007 | Bell et al. |
| 2008/0007555 A1 | 1/2008 | Vrba et al. |
| 2008/0221811 A1 | 9/2008 | Slemp et al. |
| 2013/0326383 A1 | 12/2013 | Gatti et al. |
| 2015/0012247 A1 | 1/2015 | Bowers et al. |
| 2017/0030349 A1 | 2/2017 | Bassett et al. |
| 2018/0011065 A1 | 1/2018 | Bowers, III et al. |
| 2018/0321836 A1 | 11/2018 | Tappan et al. |

FOREIGN PATENT DOCUMENTS

| | | |
|---|---|---|
| WO | 9960351 A1 | 11/1999 |
| WO | 2017145222 A1 | 8/2017 |

GRAPHICAL DIFFERENTIATION OF SPECTRAL FREQUENCY FAMILIES

FIELD

This invention relates to the field of machine vibration analysis. More particularly, this invention relates to techniques for differentiating between families of spectral frequencies in a graphical display of spectral vibration energy.

BACKGROUND

Developing the ability to accurately analyze machine condition spectral data typically requires many years of experience, as there are numerous spectral peaks to identify in a graphical display of such data. These spectral peaks are typically found within harmonic families. The fundamental frequencies of these harmonic families are associated with the rotation of machine shafts, bearings, stators, rotors, gears, pump vanes, and fan blades, just to mention a few. These mechanically-related harmonic families are commonly referred to as fault frequencies (FF) because the presence of high or increasing energy at these frequencies is typically an indication of a problem developing inside the machine. Not only are these fault frequencies comprised of multiple harmonics but may also contain side-band frequencies (referred to as side-band families). Many other spectral peaks and harmonic families are often present in spectral condition data that are not related to machine fault frequencies. These extra peaks make the identification of fault frequencies more difficult. Although algorithms exist for individually identifying the families of FF peaks, the individual families are often difficult to distinguish from each other on a typical spectral graphical plot.

In addition to distinguishing the multiple fault frequencies of a spectrum, it is also desirable to highlight areas of the spectrum associated with spectral band parameters. Spectral band parameters typically include larger regions of energy and are an alternative way to trend important information for analysis.

What is needed, therefore, is a system for enabling a machine condition analyst to clearly differentiate each family of fault frequency peaks and/or peaks associated with spectral band parameters from one another in a spectral graphical plot.

SUMMARY

To meet the above and other needs, embodiments described herein implement methods for graphically representing energy peaks in a spectral data plot, such as using color coding, different line types, and/or filtering to differentiate spectral peaks associated with various fault frequency families and harmonic families from one another. Using these approaches, a machine condition analyst can easily see each family of peaks individually, without all the other spectral peaks, or in combinations of families that are relevant to the machine fault under investigation.

Embodiments described herein are particularly applicable when the analyst is using a computer-based condition analysis software application that gives the analyst access not only to current spectral data, but also to a history of related scalar parameters that can be plotted in conjunction with the current spectral data. This allows spectral vibration plots to be synchronized with a trend plot.

Embodiments described herein are directed to a computer implemented method for processing machine condition data to aid in visualizing vibration spectral energy peaks. One embodiment of the method includes the following steps:

(a) accessing time waveform machine condition data from a memory or storage device, wherein the time waveform machine condition data was measured at a first measurement time that occurred within an extended period of time;

(b) performing a Fast Fourier Transform on the time waveform machine condition data to generate a spectrum;

(c) locating spectral peaks in the spectrum;

(d) identifying one or more harmonic families of peaks within the spectral peaks;

(e) identifying fault frequency peaks within the one or more harmonic families of peaks;

(f) receiving input from an interface device operated by a user to select one or more groups of fault frequency peaks or one or more harmonic families of peaks to be displayed; and (g) displaying the one or more groups of fault frequency peaks or the one or more harmonic families of peaks in a spectral plot on a graphic display device, wherein each of the one or more groups of fault frequency peaks or the one or more harmonic families of peaks is displayed in a color or a line style that is different from colors or line styles in which other spectral peaks are displayed.

In some embodiments, the machine condition data comprises one or more of vibration data, current data, and flux data.

In some embodiments, the method includes:

(h) identifying running speed peaks in the spectral peaks;

(i) receiving input from the interface device operated by the user to select a group of running speed peaks to be displayed; and (j) displaying the group of running speed peaks in the spectral plot on the graphic display device in a color or a line style that is different from colors or line styles in which other spectral peaks are displayed.

In some embodiments, the one or more groups of fault frequency peaks, the one or more harmonic families of peaks, and the group of running speed peaks are selected to be displayed individually or in any combination.

In some embodiments, the method includes displaying the spectrum with the one or more groups of fault frequency peaks or the one or more harmonic families of peaks in the spectral plot on the graphic display device.

In some embodiments, the method includes:

(g) receiving input from the interface device operated by the user to select a machine type; and (h) displaying in the spectral plot one or more groups of fault frequency peaks or the one or more harmonic families of peaks that are associated with the machine type selected.

In some embodiments, the machine type is selected from the group consisting of bearing, motor, pump, and gearbox.

In some embodiments, the method includes:

(g) determining energy associated with each of the one or more groups of fault frequency peaks selected in step (e) over the extended period of time; and (h) displaying the energy associated with each of the one or more groups of selected fault frequency peaks in a trend plot that is displayed on the graphic display device simultaneously with the spectral plot, wherein the trend plot covers the extended period of time.

In some embodiments, the method includes:
(i) displaying a time-based cursor at a first position on the trend plot that corresponds to the first measurement time within the extended period of time;
(j) receiving input from the interface device operated by the user to move the time-based cursor to a second position on the trend plot that corresponds to a second measurement time within the extended period of time;
(k) accessing time waveform machine condition data from the memory or storage device that was measured at the second measurement time; and
(l) repeating one or more of steps (b) through (f) to update the spectral plot using the time waveform machine condition data that was measured at the second measurement time.

In some embodiments, the method includes displaying in the spectral plot additional spectral peaks that are unrelated to fault frequency peaks or running speed peaks, wherein the additional spectral peaks are displayed in a color or a line style that is different from colors or line styles in which other spectral peaks are displayed.

Another embodiment of the method includes the following steps:
(a) accessing time waveform machine condition data from a memory or storage device;
(b) performing a Fast Fourier Transform on the time waveform machine condition data to generate a spectrum;
(c) locating spectral peaks in the spectrum;
(d) identifying fault frequency peaks in the spectral peaks;
(e) receiving input from an interface device operated by a user to select a machine type;
(f) identifying one or more groups of the fault frequency peaks associated with the machine type selected; and
(g) displaying in a spectral plot on a graphic display device the one or more groups of fault frequency peaks that are identified as associated with the machine type selected.

In some embodiments, each of the one or more groups of fault frequency peaks is displayed in a color or a line style that is different from colors or line styles in which other spectral peaks are displayed.

Another embodiment of the method includes the following steps:
(a) accessing time waveform machine condition data from a memory or storage device, wherein the time waveform machine condition data was measured at a first measurement time that occurred within an extended period of time;
(b) performing a Fast Fourier Transform on the time waveform machine condition data to generate a spectrum;
(c) locating spectral peaks in the spectrum;
(d) identifying fault frequency peaks in the spectral peaks;
(e) receiving input from an interface device operated by a user to select one or more groups of fault frequency peaks to be displayed;
(f) displaying the one or more groups of fault frequency peaks in a spectral plot on a graphic display device;
(g) determining energy associated with each of the one or more groups of fault frequency peaks selected in step (e) over the extended period of time; and
(h) displaying the energy associated with each of the one or more groups of fault frequency peaks in a trend plot that is displayed on the graphic display device simultaneously with the spectral plot, wherein the trend plot covers the extended period of time.

In some embodiments, the method includes:
(i) displaying a time-based cursor at a first position on the trend plot that corresponds to the first measurement time within the extended period of time;
(j) receiving input from the interface device operated by the user to move the time-based cursor to a second position on the trend plot that corresponds to a second measurement time within the extended period of time;
(k) accessing time waveform machine condition data from the memory or storage device that was measured at the second measurement time; and
(l) repeating one or more of steps (b) through (f) to update the spectral plot using the time waveform machine condition data that was measured at the second measurement time.

In some embodiments, each of the one or more groups of fault frequency peaks is displayed in a color or a line style that is different from colors or line styles in which other spectral peaks are displayed.

BRIEF DESCRIPTION OF THE DRAWINGS

The patent or application file contains at least one drawing executed in color. Copies of this patent or patent application publication with color drawing(s) will be provided by the Office upon request and payment of the necessary fee. Various embodiments of the invention will become apparent by reference to the detailed description in conjunction with the figures, wherein elements are not to scale so as to more clearly show the details, wherein like reference numbers indicate like elements throughout the several views, and wherein.

DETAILED DESCRIPTION

Definitions:
a. Harmonic Family of Peaks—a group of harmonic peaks within a spectrum, each peak defined by a frequency and amplitude, comprised of a least one peak such that the first harmonic peak is referred to as the fundamental peak and integer multiples of the fundamental peak frequency are referred to as harmonics of the fundamental peak.
b. Sideband Family of Peaks—a group of peaks within a spectrum where frequencies of these peaks include a carrier frequency and equally spaced difference frequencies on either side of the carrier frequency.
c. Fault Frequency Family of Peaks—One or more spectral peak(s) whose associated frequencies correspond with mechanically-related faults. Fault Frequency Family of Peaks is a harmonic family of peaks in which the fundamental frequency is associated with mechanical characteristics such as rotation of machine shafts, bearing frequencies, gearboxes parameters, pump vanes, and fan blades. Each harmonic family peak defining a Fault Frequency Family of Peaks may also be a carrier frequency for a sideband family of peaks.

d. Running Speed Peaks—A special subset of Harmonic Family of Peaks in which the fundamental peak is equal in frequency value to the running speed (turning speed) of the shaft under analysis.

e. Spectral Band Parameter (analysis parameter)—Single scalar value calculated as the "energy" of the frequency range defined by the spectral band. The spectral band is generally calculated over a range of frequencies (for example from 3× to 8× of RPM or 90 Hz to 240 Hz). Changes in the trend of the Spectral Band Parameter can indicate potential faults associated with the parameter value.

f. Fault Frequency Family Parameter—Single scalar value calculated by calculating the "total energy" produced from all the peaks found within a Fault Frequency Family of Peaks.

g. Family—a general term referring to the frequencies associated with a group of spectral peaks.

h. Family of Peaks—a general term referring to the frequency and amplitude associated with a group of spectral peaks.

i. Parameter—a single scalar value representative of the state or condition of equipment under analysis.

Figure 1:
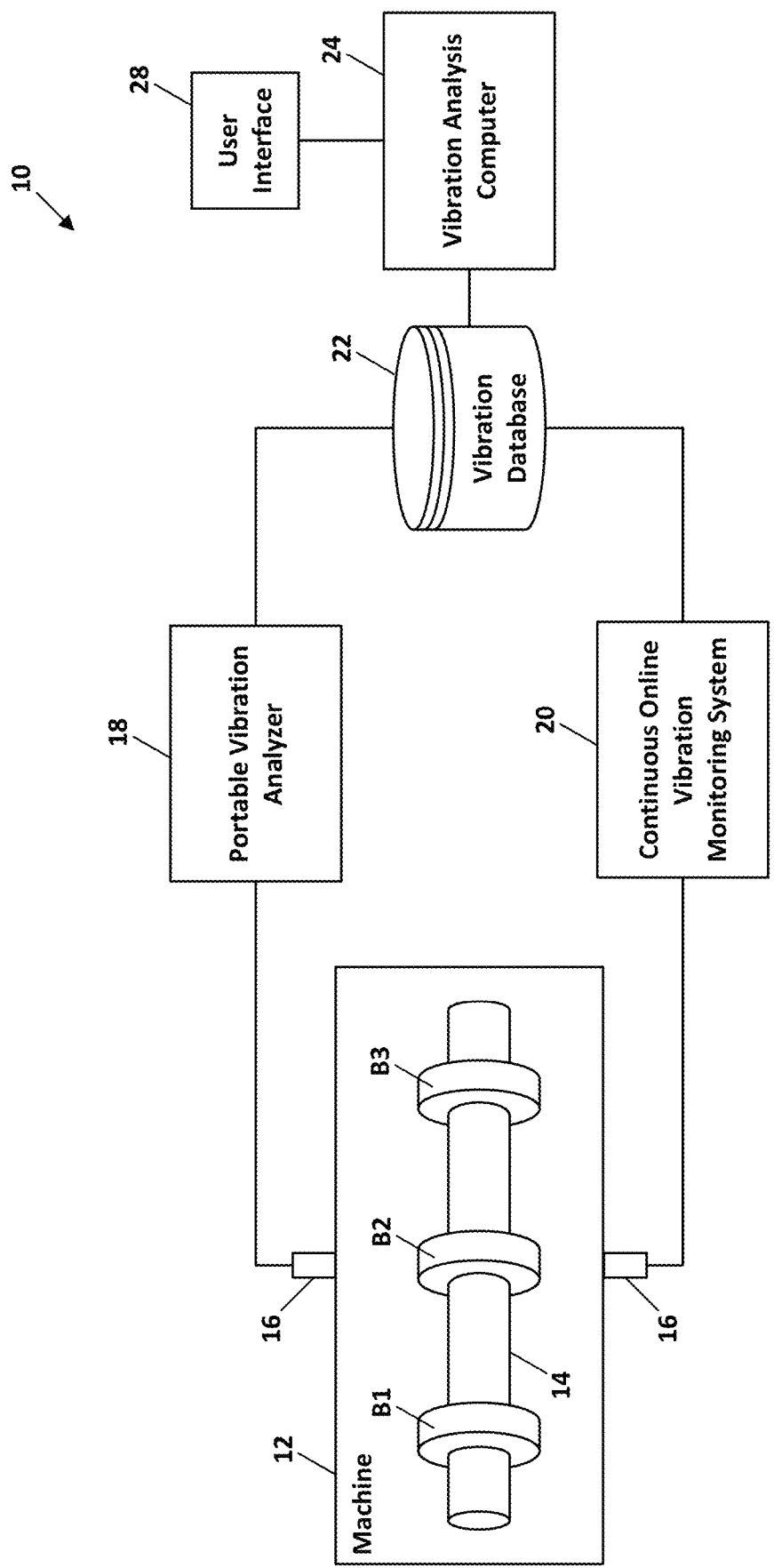
FIG. 1 depicts a vibration data collection and analysis system according to an embodiment of the invention.
Figure 2:
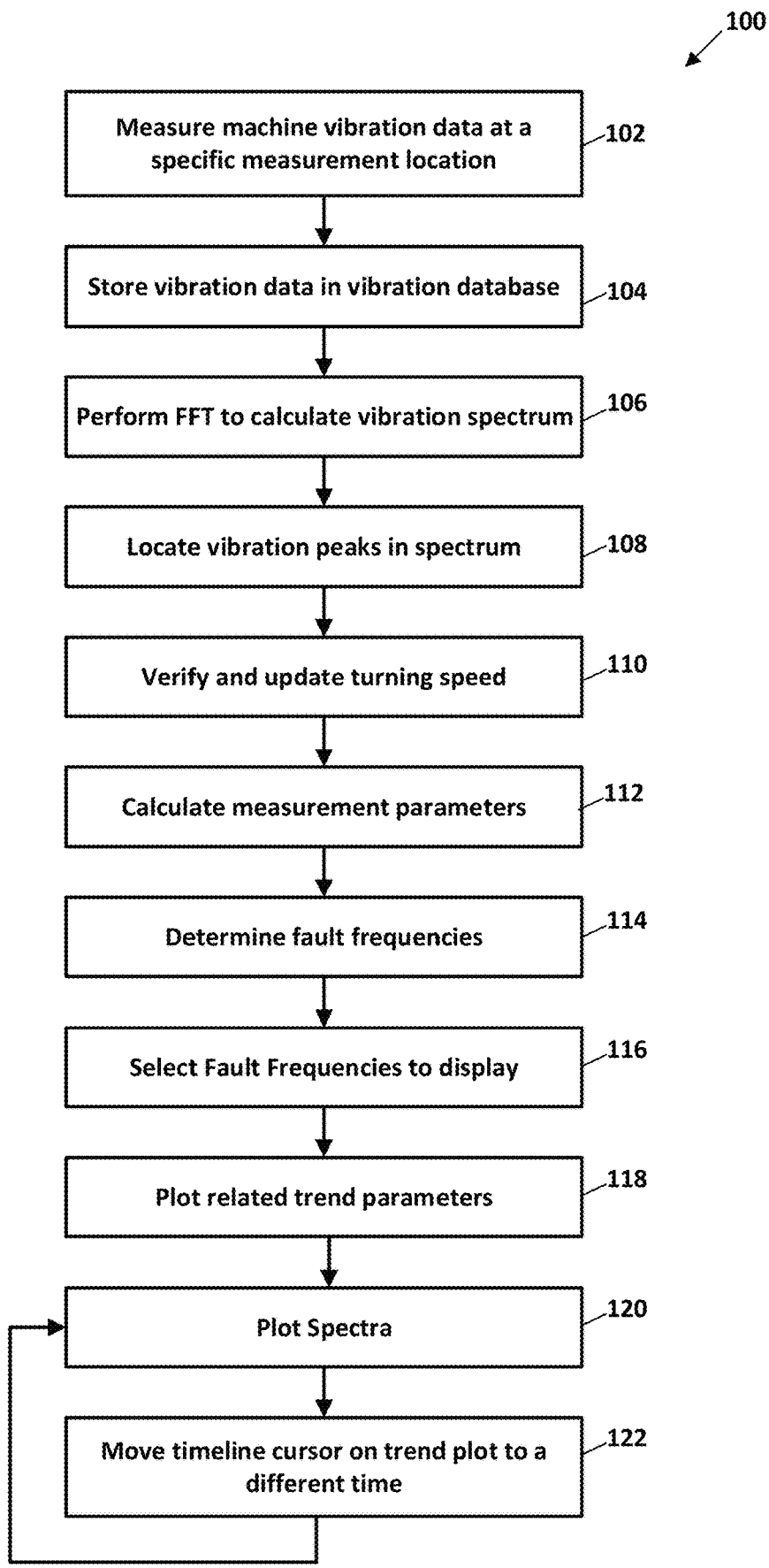
FIG. 2 depicts method for processing and displaying vibration data according to an embodiment of the invention.

As depicted in FIG. 1, a machine condition measurement and analysis system 10 includes sensors, such as vibration sensors 16, attached to a machine 12. In other embodiments, machine conditions other than vibration may be sensed, such as current or flux. FIG. 2 depicts a process 100 performed using the system 10 of FIG. 1 for collecting and analyzing vibration data, and displaying the data in a spectral vibration graphical plot in a manner that allows a machine vibration analyst to clearly differentiate each family of fault frequency peaks from one another. The machine 12 includes at least one rotating component 14, such as a shaft supported by bearings B1, B2, and B3. In one embodiment, the vibration sensors 16 are placed on the machine 12 in vertical, horizontal and axial positions at each bearing location. The vibration sensors 16 generate vibration signals representative of the vibration of the machine 12, which include vibration components associated with the bearings B1, B2, and B3. The vibration signals are received, conditioned, and converted to time waveform digital data by one or more vibration data collectors, such as a portable vibration analyzer 18 or a continuous online vibration monitoring system 20 (step 102 in FIG. 2). The vibration data collectors 18 and 20 include signal conditioning circuitry and analog-to-digital conversion circuitry for conditioning the vibration signals from the sensors 16 and generating the time waveform digital vibration data based thereon.

The vibration time waveform data are preferably downloaded to a vibration database 22 for long term storage. The data in the database 22 is available for analysis by software routines executed on a vibration analysis computer 24 (step 104). Alternatively, the vibration time waveform data are stored in data storage devices in the portable vibration analyzer 18 or the continuous online vibration monitoring system 20. In preferred embodiments, the system 10 includes a user interface 28, such as a touch screen, that allows a user to view measurement results, select certain measurement parameters, and provide other input as described herein.

Figure 3:
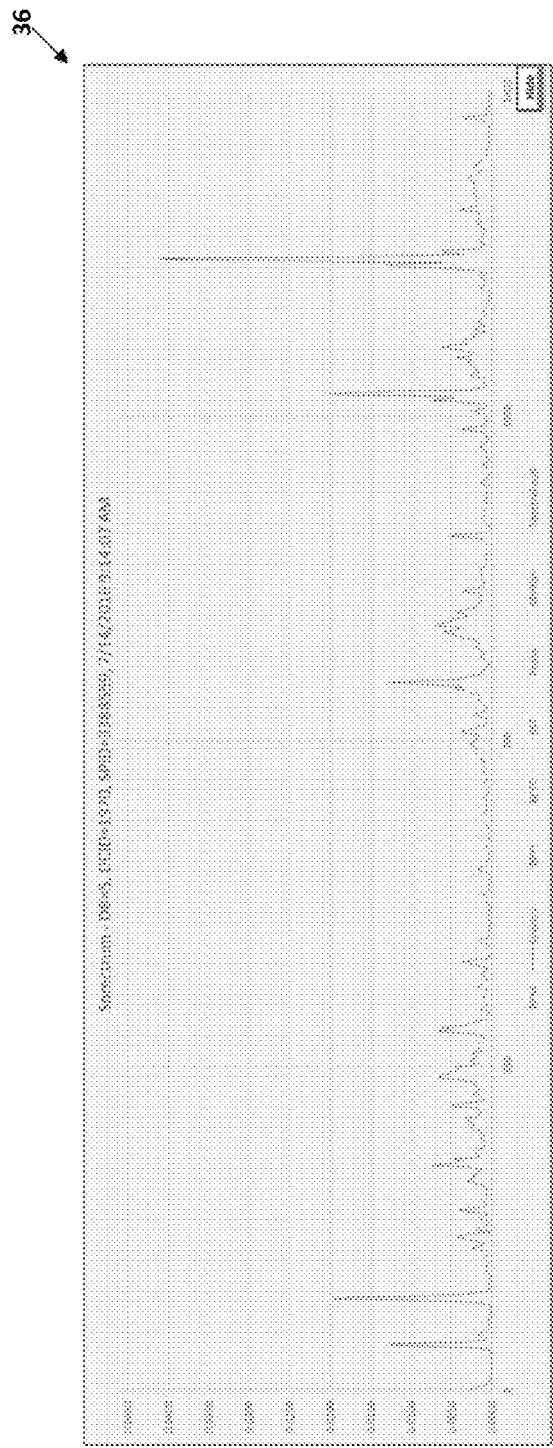
FIG. 3 depicts a graphical plot of a machine vibration spectrum generated according to an embodiment of the invention.

In various embodiments, a processor in the portable vibration analyzer 18, or in the continuous online vibration monitoring system 20, or in the vibration analysis computer 24 enables the performance of steps 106 through 122 in the method of FIG. 2. In step 106, a Fast Fourier Transform (FFT) is performed on a selected vibration time waveform to generate a vibration spectrum (step 106). FIG. 3 depicts an example of a plot of a vibration spectrum 36. Amplitude peaks in the vibration spectrum are identified using a peak location algorithm such as described in U.S. patent publication number US20180011065A1, the entirety of which is incorporated herein by reference (step 108).

Because the accurate calculation of most vibration measurement parameters is dependent on an accurate turning speed, the turning speed of the machine 12 is first verified and adjusted if necessary (step 110), before various vibration measurement parameters are calculated (step 112). A turning speed algorithm may be used to accurately determine the rotational speed of the machine 12, such as described in U.S. patent application Ser. No. 15/946,403 titled "Determination of RPM from Vibration Spectral Plots," the entirety of which is incorporated herein by reference. Examples of vibration measurement parameters that may be calculated include spectral bands for multiples of turning speed, slot pass frequencies, and synchronous and non-synchronous spectral bands.

Figure 4:
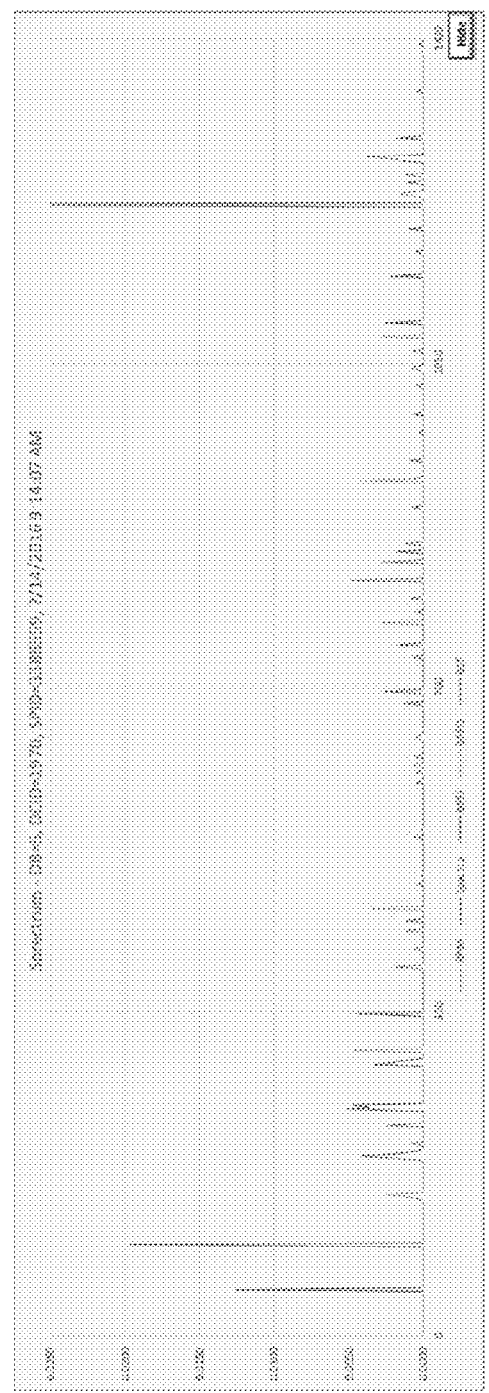
FIG. 4 depicts a graphical spectral plot of individual vibration peaks generated according to an embodiment of the invention.

Depending on the type of machine 12 being analyzed, the appropriate fault frequency (FF) peaks are identified from the previously determined spectral peaks (i.e. bearing FF peaks for roller bearings, motor FF peaks for an electric motor, etc.) (step 114). For example, for roller bearings the fault frequencies may include the Ball Pass Frequency of the Inner race (BPFI), Ball Pass Frequency of the Outer race (BPFO), Ball Spin Frequency (BSF), and Fundamental Train Frequency (FTF). An example of a spectral plot 30 that includes BPFI, BPFO, and BSF peaks displayed in different colors is depicted in FIG. 4.

Figure 5:
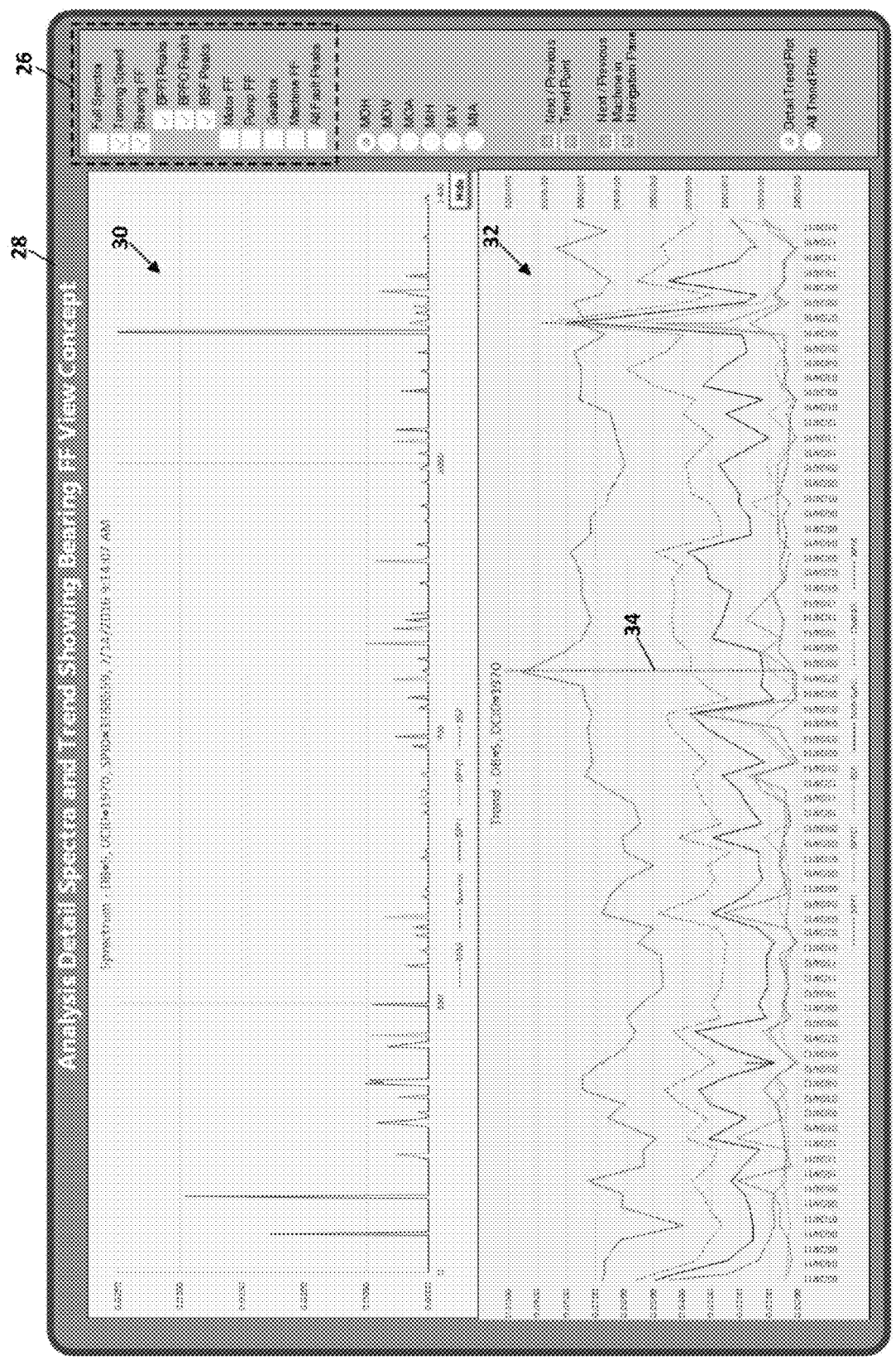
FIGS. 5, 6, and 7 depict graphical spectral and trend plots of machine vibration data generated according to an embodiment of the invention.
Figure 6:
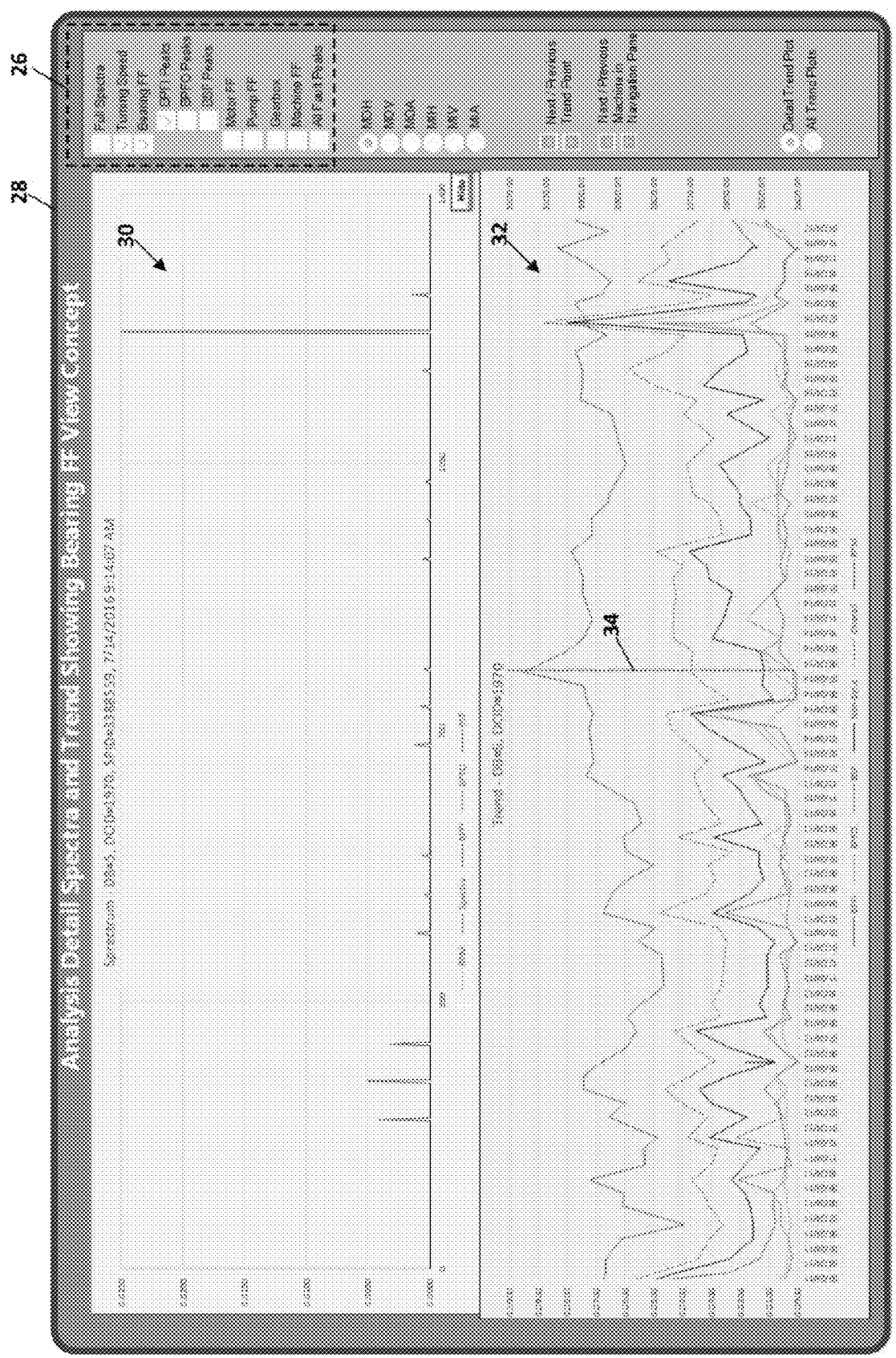
Figure 7:
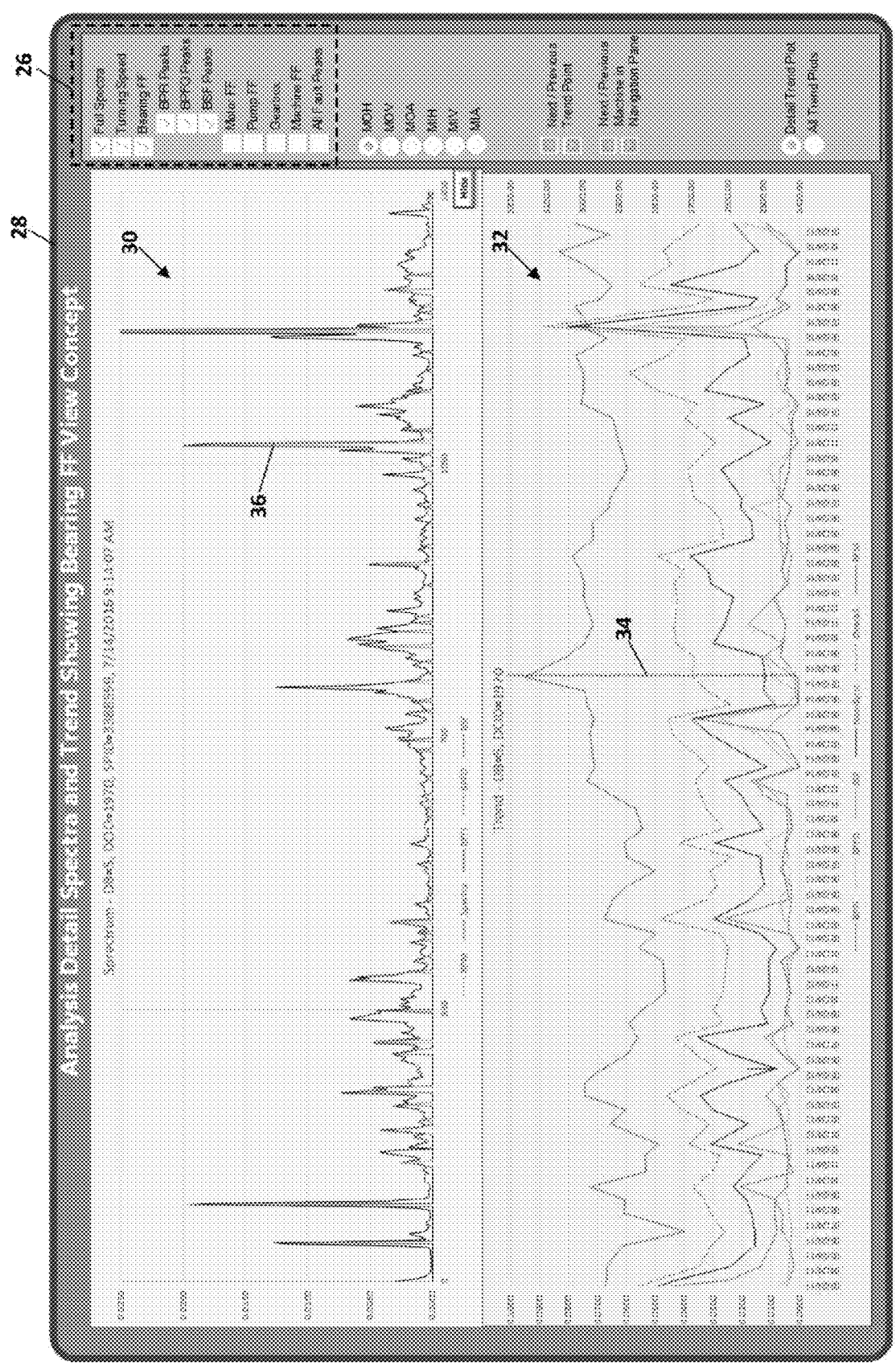

In one preferred embodiment depicted in FIGS. 5-7, the desired content of the spectral plot 30 to be displayed is selected and filtered using a set of check boxes 26 provided on the user interface 28 (step 116). This allows selecting the possible FF families of peaks to display and selecting whether the turning speed peaks and/or full spectra should also be plotted. In this manner, the analyst may select any appropriate combination of spectral peaks to be included in the plot depending on the type of machine fault that the analyst is trying to identify.

After selection of the FF families to display, the spectral plot 30 is generated (step 120), further examples of which are depicted in FIGS. 5-7. The spectral plot 30 in FIG. 5 shows an example in which all of the bearing FF peaks are selected, with each family of peaks depicted in a different color. FIG. 6 shows only the BPFI peaks, all of which are plotted in one color. FIG. 7 shows all of the bearing FF peaks (in various colors) overlaid on the full spectrum plot (in black), thereby allowing the analyst to see what the overall spectrum looks like relative to the bearing FF peaks.

In a preferred embodiment, each family of FF spectral peaks has a related set of scalar parameters that may be plotted over time on a trend plot on the user interface 28 (i.e., total energy for the BPFI, BPFO, BSF bearing FF families of peaks) (step 118). For ease of reference, the color of each family of peaks in the spectral plot 30 matches the color of the corresponding trend data in the trend plot 32. Examples of trend plots 32 are depicted in FIGS. 5-7. In some embodiments, the trend plot 32 has different colored or patterned lines to show the related bearing FF energy parameters over time, and the non-synchronous and overall energy plotted over time. These trend lines are preferably plotted on a common vertical axis so that the relative amplitude of the parameters can be evaluated by the analyst. This gives the analyst a good overall view of the evolution of the bearing performance and development of faults over time. The turning speed, which is an important characteristic of the machine, may also be plotted over time on an alternate vertical axis.

The trend plot 32 preferably includes a vertical time-based cursor 34 that is synchronized with the spectral plot 30. When the time line cursor 34 is moved to the left or right on the time axis (step 122), the spectral plot 30 is updated based on vibration data collected at the time indicated by the cursor position (step 120), thereby allowing the analyst to see how the spectral plot 30 has changed over time.

There are situations in which harmonic families and individual vibration peaks do not match the machine turning speed or fault frequencies of the machine being analyzed. The appearance of these unexplained frequencies in a spectral plot may be the result of vibration from nearby machines. Some embodiments allow an analyst to highlight peaks of interest with a color or line type to differentiate them from machine turning speed or FF peaks. An analysist may also want to scan through a spectrum and find the various harmonic families. The ability to highlight these harmonic families using color/line types provides a useful picture for the analysist.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A computer implemented method for processing machine vibration data to aid in visualizing vibration spectral energy peaks, comprising:
    (a) accessing time waveform machine condition data from a memory or storage device, wherein the time waveform machine condition data was measured at a first measurement time that occurred within an extended period of time;
    (b) performing a Fast Fourier Transform on the time waveform machine condition data to generate a spectrum;
    (c) locating spectral peaks in the spectrum;
    (d) identifying fault frequency peaks in the spectral peaks;
    (e) receiving input from an interface device operated by a user to select one or more groups of fault frequency peaks to be displayed; and
    (f) displaying the one or more selected groups of fault frequency peaks in a spectral plot on a graphic display device, wherein each of the one or more selected groups of fault frequency peaks is displayed in a color or a line style that is different from colors or line styles in which other spectral peaks are displayed.

2. The method of claim 1 further comprising determining the running speed of the machine prior to step (d).

3. The method of claim 1 wherein:
    step (d) includes identifying running speed peaks in the fault frequency peaks;
    step (e) includes receiving input from the interface device operated by the user to select a group of running speed peaks to be displayed; and
    step (f) includes displaying the group of running speed peaks in the spectral plot on the graphic display device in a color or a line style that is different from colors or line styles in which other spectral peaks are displayed.

4. The method of claim 3 wherein the one or more groups of fault frequency peaks and the group of running speed peaks are selected to be displayed individually or in any combination.

5. The method of claim 1 further comprising displaying the spectrum with the one or more groups of fault frequency peaks in the spectral plot on the graphic display device.

6. The method of claim 1 further comprising:
    (g) receiving input from the interface device operated by the user to select a machine type; and
    (h) displaying in the spectral plot one or more groups of fault frequency peaks that are associated with the machine type selected.

7. The method of claim 6 wherein the machine type is selected from the group consisting of bearing, motor, pump, and gearbox.

8. The method of claim 1 further comprising:
    (g) determining energy associated with each of the one or more groups of fault frequency peaks selected in step (e) over the extended period of time; and
    (h) displaying the energy associated with each of the one or more groups of selected fault frequency peaks in a trend plot that is displayed on the graphic display device simultaneously with the spectral plot, wherein the trend plot covers the extended period of time.

9. The method of claim 8 further comprising:
    (i) displaying a time-based cursor at a first position on the trend plot that corresponds to the first measurement time within the extended period of time;
    (j) receiving input from the interface device operated by the user to move the time-based cursor to a second position on the trend plot that corresponds to a second measurement time within the extended period of time;
    (k) accessing time waveform machine condition data from the memory or storage device that was measured at the second measurement time; and
    (l) repeating one or more of steps (b) through (f) to update the spectral plot using the time waveform machine condition data that was measured at the second measurement time.

10. The method of claim 1 further comprising:
    (g) determining energy associated with one or more spectral band parameters over the extended period of time; and
    (h) displaying the energy associated with the one or more spectral band parameters in a trend plot that is displayed on the graphic display device simultaneously with the spectral plot, wherein the trend plot covers the extended period of time.

11. The method of claim 1 further comprising displaying in the spectral plot additional spectral peaks that are unrelated to the one or more selected groups of fault frequency peaks or running speed peaks, wherein the additional spectral peaks are displayed in a color or a line style that is different from colors or line styles in which other spectral peaks are displayed.

12. The method of claim 1 wherein the machine condition data comprises one or more of vibration data, current data, and flux data.

13. A computer implemented method for processing machine condition data to aid in visualizing spectral energy peaks, comprising:
 (a) accessing time waveform machine condition data from a memory or storage device;
 (b) performing a Fast Fourier Transform on the time waveform machine condition data to generate a spectrum;
 (c) locating spectral peaks in the spectrum;
 (d) identifying fault frequency peaks in the spectral peaks;
 (e) receiving input from an interface device operated by a user to select a machine type;
 (f) identifying one or more groups of the fault frequency peaks associated with the machine type selected; and
 (g) displaying in a spectral plot on a graphic display device the one or more groups of fault frequency peaks that are identified as associated with the machine type selected.

14. The method of claim 13 wherein each of the one or more groups of fault frequency peaks is displayed in a color or a line style that is different from colors or line styles in which other spectral peaks are displayed.

15. The method of claim 14 wherein:
 step (d) includes identifying running speed peaks in the spectral peaks;
 step (e) includes receiving input from the interface device operated by the user to select a group of running speed peaks to be displayed; and
 step (g) includes displaying the group of running speed peaks in the spectral plot on the graphic display device in a color or a line style that is different from colors or line styles in which other spectral peaks are displayed.

16. The method of claim 13 further comprising displaying the spectrum with the one or more groups of fault frequency peaks in the spectral plot on the graphic display device.

17. The method of claim 13 wherein the machine type is selected from the group consisting of bearing, motor, pump, and gearbox.

18. The method of claim 13 further comprising displaying in the spectral plot additional spectral peaks that are unrelated to the one or more selected groups of fault frequency peaks or running speed peaks, wherein the additional spectral peaks are displayed in a color or a line style that is different from colors or line styles in which other spectral peaks are displayed.

19. The method of claim 13 wherein the machine condition data comprises one or more of vibration data, current data, and flux data.

20. A computer implemented method for processing machine condition data to aid in visualizing spectral energy peaks, comprising:
 (a) accessing time waveform machine condition data from a memory or storage device, wherein the time waveform machine condition data was measured at a first measurement time that occurred within an extended period of time;
 (b) performing a Fast Fourier Transform on the time waveform machine condition data to generate a spectrum;
 (c) locating spectral peaks in the spectrum;
 (d) identifying fault frequency peaks in the spectral peaks;
 (e) receiving input from an interface device operated by a user to select one or more groups of fault frequency peaks to be displayed;
 (f) displaying the one or more selected groups of fault frequency peaks in a spectral plot on a graphic display device;
 (g) determining energy associated with each of the one or more selected groups of fault frequency peaks; and
 (h) displaying the energy determined in step (g) in a trend plot that is displayed on the graphic display device simultaneously with the spectral plot, wherein the trend plot covers the extended period of time.

21. The method of claim 20 further comprising:
 (i) displaying a time-based cursor at a first position on the trend plot that corresponds to the first measurement time within the extended period of time;
 (j) receiving input from the interface device operated by the user to move the time-based cursor to a second position on the trend plot that corresponds to a second measurement time within the extended period of time;
 (k) accessing time waveform machine condition data from the memory or storage device that was measured at the second measurement time; and
 (l) repeating one or more of steps (b) through (f) to update the spectral plot using the time waveform machine condition data that was measured at the second measurement time.

22. The method of claim 20 wherein each of the one or more groups of fault frequency peaks is displayed in a color or a line style that is different from colors or line styles in which other spectral peaks are displayed.

23. The method of claim 20 wherein:
 step (d) includes identifying running speed peaks in the spectral peaks;
 step (e) includes receiving input from the interface device operated by the user to select a group of running speed peaks to be displayed; and
 step (f) includes displaying the group of running speed peaks in the spectral plot on the graphic display device in a color or a line style that is different from colors or line styles in which other spectral peaks are displayed.

24. The method of claim 20 further comprising displaying in the spectral plot additional spectral peaks that are unrelated to the one or more selected groups of fault frequency peaks or running speed peaks, wherein the additional spectral peaks are displayed in a color or a line style that is different from colors or line styles in which other spectral peaks are displayed.

25. The method of claim 20 wherein the machine condition data comprises one or more of vibration data, current data, and flux data.

* * * * *